(No Model.) 2 Sheets—Sheet 1.
E. J. SWEDLUND.
BICYCLE GEAR.
No. 505,335. Patented Sept. 19, 1893.
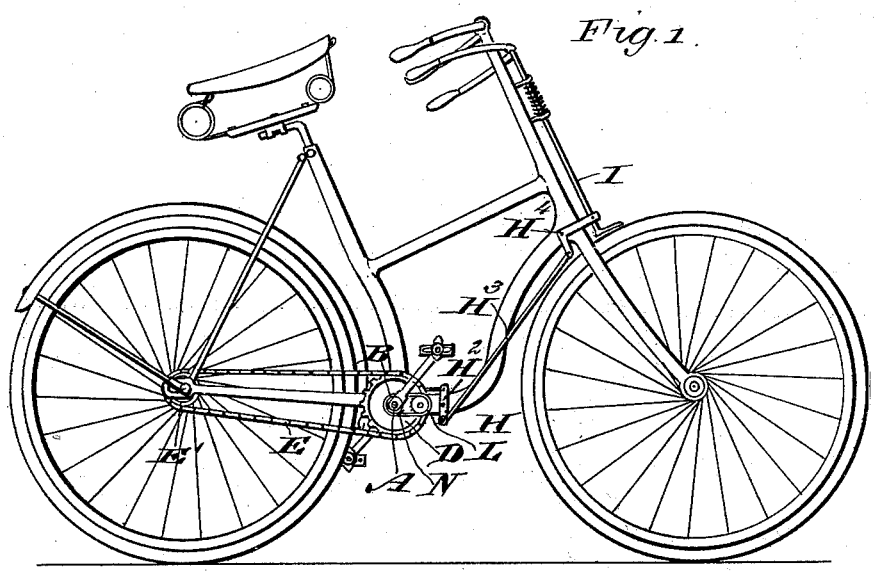
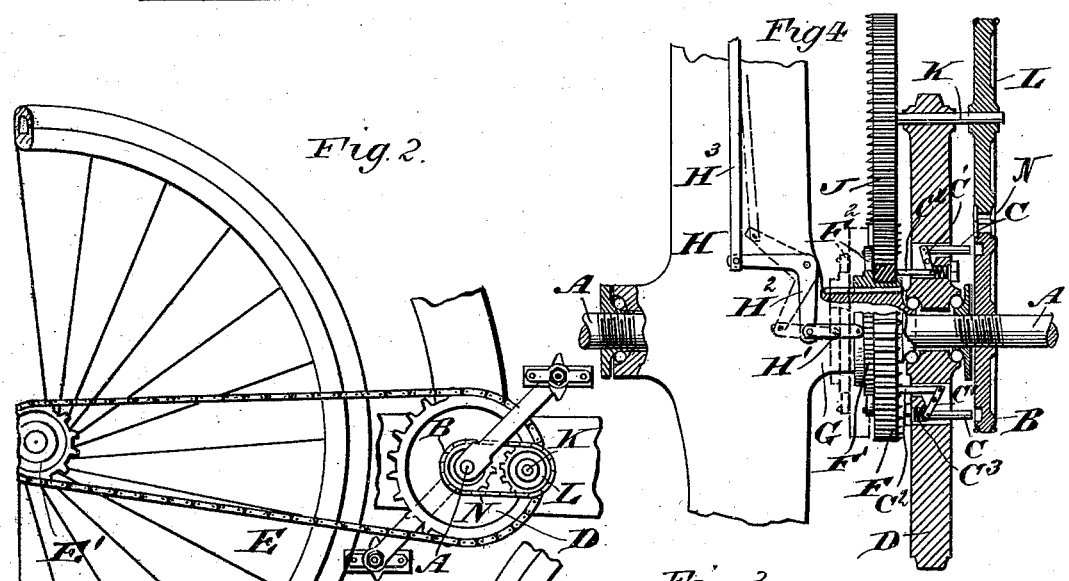
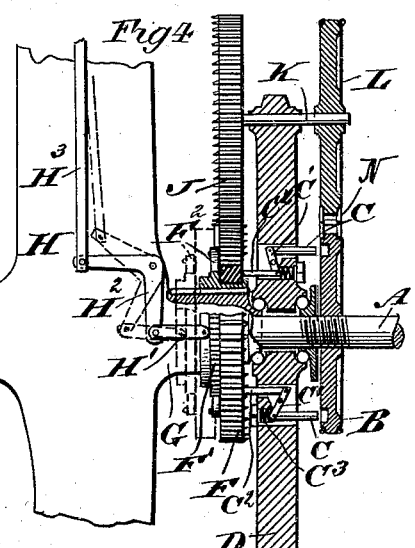
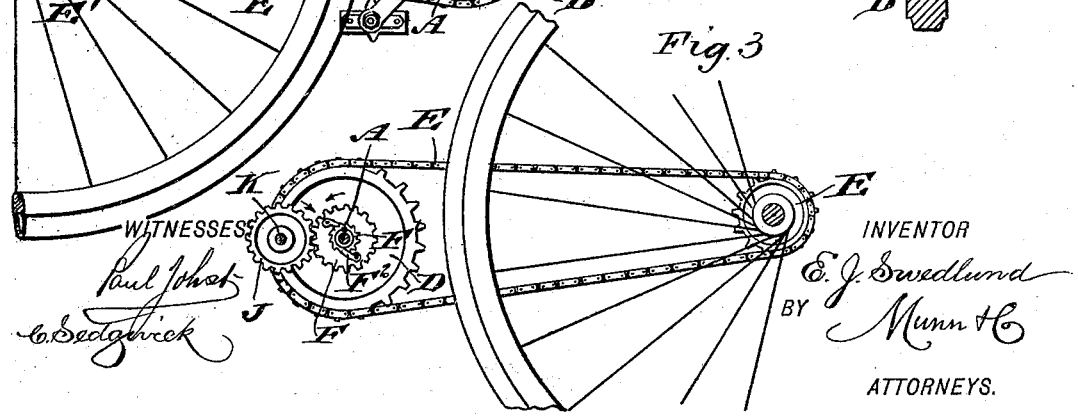
WITNESSES
Paul Johst
C. Sedgwick
INVENTOR
E. J. Swedlund
BY Munn & Co.
ATTORNEYS.

(No Model.) 2 Sheets—Sheet 2.
E. J. SWEDLUND.
BICYCLE GEAR.
No. 505,335. Patented Sept. 19, 1893.
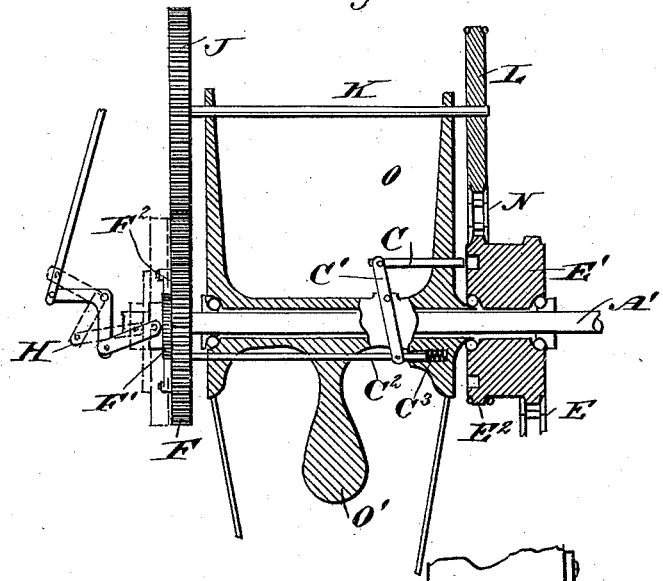
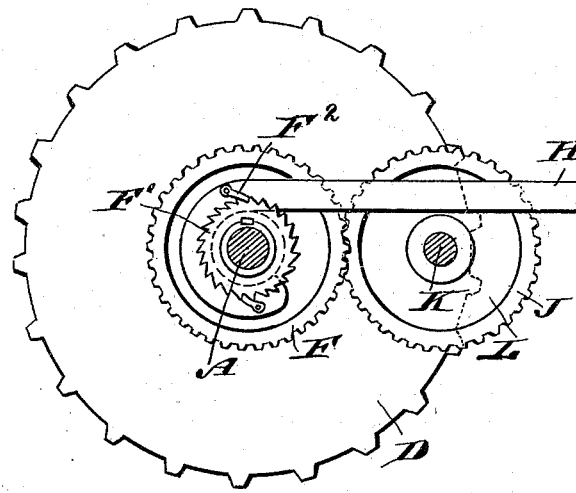
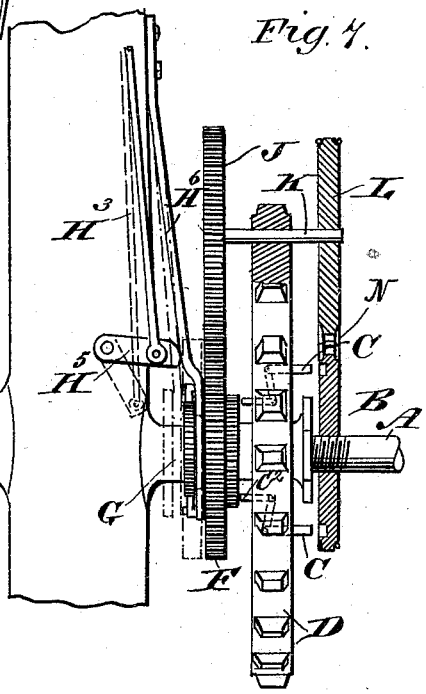
WITNESSES:
INVENTOR
E. J. Swedlund
BY Munn & Co
ATTORNEYS.

UNITED STATES PATENT OFFICE.

ERICK J. SWEDLUND, OF ATWATER, MINNESOTA.

BICYCLE-GEAR.

SPECIFICATION forming part of Letters Patent No. 505,335, dated September 19, 1893.

Application filed August 30, 1892. Serial No. 444,542. (No model.)

*To all whom it may concern:*

Be it known that I, ERICK J. SWEDLUND, of Atwater, in the county of Kandiyohi and State of Minnesota, have invented a new and Improved Bicycle-Gear, of which the following is a full, clear, and exact description.

The object of the invention is to provide a new and improved bicycle gear, which is simple and durable in construction, readily thrown in and out of gear by the rider, and arranged to permit the rider to travel with less speed and increased power for conveniently riding up hill, over rough roads, &c., without much physical exertion.

The invention consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a side elevation of the improvement as applied on a safety bicycle. Fig. 2 is an enlarged side elevation of part of the improvement. Fig. 3 is a rear side elevation of the same. Fig. 4 is an enlarged transverse section of the same. Fig. 5 is a like view of a modified form of the improvement as applied on the wheel axle. Fig. 6 is an enlarged side elevation of a further modification shown in Fig. 7 with parts in section; and Fig. 7 is an end view of the modified form shown in Fig. 6 with parts in section.

The bicycle gear illustrated in Figs. 1, 2, 3 and 4, is arranged principally on the pedal shaft A, carrying a sprocket wheel B, adapted to be engaged by pins C, held in the chain wheel D, mounted to rotate loosely on the shaft A and connected by the usual sprocket chain E, with the sprocket wheel E', on the wheel to be driven. The pins C are adapted to be thrown in mesh with the sprocket wheel B, by a gear wheel F, mounted to slide transversely by a suitable shifting mechanism H, connected with and operated from the brake rod I, of the bicycle. The gear wheel F is adapted to be thrown in mesh with a similar gear wheel J, secured on a shaft K, extending transversely and having its bearings in the web of the sprocket chain wheel D, as plainly shown in Fig. 4.

On the shaft K on the opposite face of the wheel D is secured a sprocket wheel L, connected by a chain N, with the sprocket wheel B secured on the pedal shaft A, as previously described. The gear wheel F is mounted to rotate loosely on the hub of a ratchet wheel F', mounted to slide transversely on the projection G, of the bicycle frame, the said ratchet wheel being prevented from turning by a key or other suitable means.

On the face of the gear wheel F are secured pawls $F^2$, engaging the said ratchet wheel F', so that the gear wheel F is free to turn in one direction, but is prevented from turning in the opposite direction, as the pawls engage the ratchet wheel F', which only has a transverse sliding motion, but does not turn. The pins C for locking the wheel B to the chain wheel D are pivotally-connected with a lever C', fulcrumed in the web of the wheel D and on the said lever is pivoted a rod $C^2$, which extends outward beyond the face of the wheel D to be engaged by the face of the wheel F when the latter is moved inwardly toward the wheel D. A spring $C^3$, presses on the inner end of each pin C so that when the wheel F is moved away from the wheel D, the said spring $C^3$ moves the respective pins C outward to engage a corresponding aperture in the wheel B, thus locking the latter to the wheel D. When the wheel F is moved toward the wheel D, then its face presses the rod $C^2$, thus imparting a swinging motion to the respective lever C' which latter withdraws the corresponding pin C from the wheel B, thus disconnecting the latter and the wheel D.

The mechanism H for shifting the wheel F consists of an arm H', extending from the ratchet wheel F', and pivotally-connected with a bell crank lever $H^2$, connected by a link $H^3$, with a second bell crank lever $H^4$, pivotally-connected with the brake rod I, the said bell crank levers $H^2$ and $H^4$ being fulcrumed on the bicycle frame, as will be readily understood by reference to Fig. 1.

The operation is as follows: When the bicycle travels over an ordinary good road, the wheel F is out of mesh with the wheel J and consequently the wheel B is locked to the wheel D by the pins C, as previously described, so that the rotary motion of the pedal shaft A is transmitted by the wheel B to the wheel D, and a rotary motion of the latter is transmitted by the sprocket chain E to the sprocket wheel E' and consequently to the wheel to be driven. It will be seen that the sprocket wheel D makes a revolution for every revolution of the pedal shaft A. Now, when the rider goes up a hill or over a rough road and requires more power, he then actuates the mechanism H, so as to shift the ratchet wheel F' and the gear wheel F carried thereon, inwardly to move the gear wheel F in mesh with the gear wheel J. This inward movement of the gear wheel F actuates the several pins C so as to withdraw the same from the wheel B and consequently the latter is disconnected from the sprocket wheel D, which latter rotates loosely on the pedal shaft A. The rotary motion of the latter is now transmitted by the wheel B, the chain N, and wheel L, to the shaft K and gear wheel L, which latter now rolls off on the stationary gear wheel F, so that a slow rotary motion is given to the chain wheel D. Thus the speed of the bicycle is decreased, but the power is increased so as to enable the rider to easily and conveniently ride up the hill or pass over a rough road. The gear wheel F is mounted to turn in one direction so as to permit of throwing the gear wheel conveniently into mesh with the gear wheel J without danger of breaking teeth, as the said gear wheel F is free to rotate in the same direction as the gear wheel J at the time the latter rolls off the gear wheel F when the sprocket wheel D and wheel B are connected with each other.

In the modification illustrated in Fig. 5, the mechanism is arranged on the hub of the wheel O to be driven, the sprocket chain wheel E' then being provided with an additional set of sprockets E², engaged by the chain N connected with the wheel L, the shaft K of which is now journaled in the wheel O, instead of the sprocket wheel D. The pins C are adapted to lock the wheel O to the sprocket wheel E', the same mechanism being applied to actuate the pin C from the wheel F adapted to be thrown in mesh with the gear wheel J.

In the modification illustrated in Figs. 6 and 7, the device A for shifting the gear wheel F is slightly modified, the ratchet wheel being engaged by a forked spring arm H⁶, secured to the frame of the bicycle. A pivoted arm H⁵, engages the spring arm H⁶ so as to throw the latter outwardly to move the gear wheel F from its normal resting position into mesh with the gear wheel J. The pivoted arm H⁵ is again connected with the link H³ connected by the bell crank lever H⁴ with the brake rod I, as previously described and shown in Fig. 1. It is understood that when the arm H⁵ is swung downward by pulling the brake rod I upward then the spring arm H⁶ returns to its normal position indicated in dotted lines in Fig. 7, so as to move the gear wheel F out of mesh with the gear wheel J.

As shown in Fig. 4, the wheels B and L are of the same diameter and the gear wheels F and J are likewise of the same diameter, so that the proportion is about one to two at the time the gear wheel F is in mesh with the gear wheel J, that is two revolutions of the pedal shaft A cause one revolution of the sprocket wheel D, but the sprocket wheel D may be rotated once for every three or four revolutions of the pedal shaft by changing the relative sizes of the wheels F J.

When the device is applied to the drive wheel O, as shown in Fig. 5, then I prefer a weight O' on the sleeve of the drive wheel, the said weight extending in an opposite direction to the shaft K and serving to counterbalance the weight of the shaft K, and the wheels J and L thereon.

When the machine is thrown in gear at the time of going down a hill, then the operator can hold the pedals and axle at a standstill, the operator resting his feet on the pedals.

Having thus described my invention, I claim as new and desire to secure by Letters Patent—

1. In a bicycle gear, the combination with a driven or transmitting wheel, a drive wheel concentric therewith and rotated from the treadles, a locking or clutch mechanism carried by the said driven or transmitting wheel and normally connecting it with the said drive wheel and a short shaft carried by the said driven or transmitting wheel, geared at one end to said drive wheel and provided with a spur wheel at its opposite end, of a laterally sliding gear wheel mounted on the frame work at the side of the driven or transmitting wheel opposite to the drive wheel, normally out of mesh with said spur wheel and adapted to retract or release the said locking or clutch mechanism from the drive wheel when moved into mesh with the spur wheel, substantially as set forth.

2. In a bicycle gear the combination with a driven or transmitting wheel, a drive wheel concentric therewith and rotated from the treadles, a locking or clutch mechanism carried by the said driven or transmitting wheel and normally connecting it with said drive wheel, and a short shaft carried by the said driven or transmitting wheel, geared at one end to said drive wheel and provided at its opposite end with a spur wheel, of a laterally sliding ratchet wheel mounted on the frame work concentric with the driven or transmitting wheel and at the opposite side thereof from the drive wheel, a gear wheel mounted on the ratchet wheel to be moved into and out of mesh with the said spur wheel thereby, and also adapted to release or retract the said locking or clutch mechanism when thrown into mesh with said spur wheel, and pawls mounted on said sliding gear wheel and engaging the teeth of the ratchet, substantially as set forth.

3. The combination with the frame and the treadle shaft A, of the loose driven or transmitting sprocket wheel D, on the shaft, and provided near its periphery with a transverse shaft K having a sprocket wheel L and a spur wheel J, the sprocket wheel B fast on shaft A and provided on its inner face with recesses, locking devices carried by the wheel D and normally locking it to wheel B, a sliding ratchet wheel F' on a part G of the frame at the inner side of wheel D, a gear wheel F mounted on said ratchet moved thereby into and out of mesh with wheel J and retracting said locking devices when moved into mesh with said wheel J, pawls mounted on wheel F and engaging the teeth of ratchet F' and means for sliding the ratchet F', extending within reach of the rider, substantially as set forth.

4. The combination with the bicycle frame and its treadle shaft A having a loose drive or transmitting sprocket wheel D geared to the rear bicycle wheel and provided with transverse spring projected pins C extending beyond one side and retracting pins $C^2$ therefor projecting from its opposite sides, the sprocket wheel B fast on shaft A and having recesses into which pins C normally project, a shaft K carried by wheel D and having a sprocket L geared to wheel B and a gear wheel J at its opposite end, the sliding ratchet wheel F' on the part G of the frame, a gear wheel F mounted on the ratchet wheel F' and having pawls $F^2$ engaging the ratchet teeth, and the lever mechanism H actuated from the brake lever to throw the wheel F against pins $C^2$ and into mesh with a wheel J, substantially as set forth.

ERICK J. SWEDLUND.

Witnesses:
S. M. SIVERTSON,
L. A. VIK.